(12) United States Patent
Lotlikar et al.

(10) Patent No.: US 8,464,263 B2
(45) Date of Patent: Jun. 11, 2013

(54) SCHEDULING WORK REQUESTS TO PERFORMING CENTERS BASED ON OVERALL COST AND DURATION OF MULTIPLE ASSIGNMENT OPTIONS

(75) Inventors: Rohit M. Lotlikar, Bangalore (IN); Ramana V. Polavarapu, Bangalore (IN); Biplav Srivastava, Noida (IN); Sadhika Sharma, Delhi (IN); Shailabh Nagar, Bangalore (IN); Nagavijayalakshmi Vydyanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 12/388,570

(22) Filed: Feb. 19, 2009

(65) Prior Publication Data
US 2010/0211957 A1    Aug. 19, 2010

(51) Int. Cl.
*G06F 9/46*    (2006.01)
(52) U.S. Cl.
USPC .......................................................... 718/102
(58) Field of Classification Search
None
See application file for complete search history.

(56) References Cited

U.S. PATENT DOCUMENTS

| | | | |
|---|---|---|---|
| RE38,633 E | 10/2004 | Srinivasan | |
| 7,320,131 B1 * | 1/2008 | O'Toole, Jr. | 718/104 |
| 2006/0053043 A1 | 3/2006 | Clarke | |
| 2007/0124186 A1 * | 5/2007 | Virine | 705/8 |
| 2007/0150327 A1 | 6/2007 | Dromgold | |
| 2007/0288283 A1 | 12/2007 | Fitzpatrick | |

OTHER PUBLICATIONS

Sengupta et al., A Research Agenda for Distributed Software Development, In Proceeding of the 28th international conference on Software engineering, pp. 731-740. ACM, May 2006.
Herbsleb et al., Architectures, Coordination, and Distance: Conway's Law and Beyond, Software, IEEE vol. 16, Issue 5, Sep./Oct. 1999, pp. 63-70.
Keil et al., Cost Estimation for Global Software Development, EDSER 06, Proc. 2006 Intl. Work. on Economics-driven Software Engg. Res., pp. 7-10, New York, NY, USA, 2006, ACM.
Journal of Risk, The quantification of operational risk, http://www.thejournalofrisk.com/public/showPage.html?page=299046, 2005, p. 1.
IBM, Rational Portfolio Manager, http://www-01.ibm.com/software/awdtools/portfolio/, 2007, pp. 1-2.
Anne Smith Duncan, Software Development Productivity Tools and Metrics, 1998 IEEE, pp. 41-48.
Leippold et al., The Quantification of Operational Risk, The Journal of Risk, Nov. 3, 2003, pp. 1-36.
Sinha et al., Enabling Collaboration in Distributed Requirements Management, IEEE Software, IEEE Computer Society, 2006, pp. 52-61.
Generalized assignment problem, Wikipedia, http://en.wikipedia.org/wiki/Generalized_Assignment_Problem downloaded May 7, 2009, pp. 1-2.

(Continued)

*Primary Examiner* — David Huisman
(74) *Attorney, Agent, or Firm* — Ryan, Mason & Lewis, LLP

(57) ABSTRACT

Techniques for allocating work requests to performing centers include generating options for assigning the work requests to the performing centers. The options are based upon predetermined historical factors capturing work request characteristics and performing center characteristics. For each of the options, the work requests are scheduled to determine a corresponding duration of the work requests, and an overall cost is computed. One of the options is selected based on the overall cost and the corresponding duration.

17 Claims, 8 Drawing Sheets

OTHER PUBLICATIONS

Battin et al., Leveraging Resources in Global Software Development, IEEE Software, Mar./Apr. 2001, pp. 70-77.

Biplav Srivastava, A Decision-support Framework for Component Reuse and Maintenance in Software Project Management, Proceedings of the Eighth European Conference on Software Maintenance and Reengineering (CSMR '04) 2004 IEEE, pp. 1-10.

S. H. Kan, Metrics and Models in Software Quality Engineering, "Software Quality Metrics Overview," Addison-Wesley Longman Publishing Co., 1994, pp. 85-100.

M. Fernandez Lopez, Overview of Methodologies for Building Ontologies, Proceedings of the IJCAI-99 workshop on Ontologies and Problem-Solving Methods (KRR5) Stockholm, Sweden, Aug. 2, 1999. pp. 1-13.

Program Evaluation and Review Technique, Wikipedia, http://en.wikipedia.org/wiki/Program_Evaluation_and_Review_Technique downloaded May 7, 2009, pp. 1-6.

Hayes, The Easiest Hard Problem, American Scientist, Mar.-Apr. 2002, vol. 90 No. 2, pp. 1-4 DOI: 10.1511/2002.2.113 http://www.americanscientist.org/issues/id.3278,y.0,no.,content.true,page.1,css.print/issue.aspx.

Wikipedia, Open Workbench, en.wikipedia.org/wiki/Open_Workbench, pp. 1-2, published on Feb. 18, 2009.

Microsoft, Overview of Microsoft Office Project Standard 2007 and Office Project Professional 2007, Microsoft Office Project Standard 2007, Apr. 2006, 21 pages.

* cited by examiner

*FIG. 2*

| COMPETENCY | JOB ROLE-SKILL SET | BLR 1 | BLR 2 | BEIJING | NEW YORK |
|---|---|---|---|---|---|
| APPLICATION DEVELOPMENT | APP DEV-JAVA | 7 | 2 | 5 | 7 |
| | TESTER | 3 | 3 | 6 | 9 |
| | ANALYST-JAVA | 7 | 7 | 3 | 2 |
| MAINFRAME | TECH LEAD | 8 | 3 | 1 | 8 |
| | APP DEV-COBOL | 3 | 6 | 6 | 1 |
| | APP DEV-AS400 | 6 | 6 | 6 | 9 |
| | TESTERS | 4 | 6 | 6 | 6 |

*FIG. 3*

| JOB ROLE-SKILL SET | BLR 1 | BLR 2 | BEIJING | NEW YORK |
|---|---|---|---|---|
| APP DEV-JAVA | 2 | 0 | 4 | 4 |
| TESTERS | 0 | 3 | 6 | 9 |

*FIG. 4*

| | MAINTAIN APP MAINTAIN APP | MAINTAIN APP: CODE | MAINTAIN APP - TEST |
|---|---|---|---|
| BLR - 1 | 0 | 1 | 0 |
| BLR - 2 | 0 | 0 | 1 |
| BEIJING | 2 | 2 | 2 |
| NYC | 2 | 2 | 3 |

FIG. 5

| NOTATION | QUANTITY |
|---|---|
| $E_b$ | BASE EFFORT (FOR EACH $WR$ TYPE) |
| $E_e$ | ESTIMATED EFFORT AFTER ADJUSTMENT FACTORS |
| $E_a$ | ACTUAL EFFORT |
| $D_b$ | BASE DURATION (FOR EACH $WR$ TYPE) |
| $D_e$ | ESTIMATED DURATION AFTER ADJUSTMENT FACTORS |
| $D_a$ | ACTUAL DURATION |
| $A_D$ | DURATION ADJUSTMENT FACTOR (FOR EACH $WR$ TYPE) |
| $A_P$ | PRODUCTIVITY ADJUSTMENT FACTOR |
| $A_C$ | COLLABORATION ADJUSTMENT FACTOR |

FIG. 6

| FEATURES | POSSIBLE VALUES |
|---|---|
| TECHNICAL | .NET, AIX, C, C++, DATA WAREHOUSING, J2EE, JAVA, JSP, LINUX, ORACLE, ORACLE APPs, ORACLE FINANCIAL, SAP, SIEBEL, TELECOM, UML, WINDOWS, XML |
| SKILLS | ARCHITECT, BUSINESS, ANALYST, CONSULTANT, DESIGNER DEVELOPER, MANAGER, PROGRAM MANAGER, PROJECT MANAGER, SYSTEM ARCHITECT, TECHNICAL LEAD TESTER |
| SKILL PREFIX | JUNIOR, SENIOR, $\perp$ |

FIG. 7

GENERIC RELATIONS:
R1: JUNIOR PREFIX IS LESS SKILLED THAN $\perp$ (NO PREFIX)
$R2$: SENIOR PREFIX IS MORE SKILLED THAN $\perp$ SPECIFIC TECHNOLOGY-BASED RELATIONS:
$R3$: A J2EE PERSON KNOWS JAVA
$R4$: ANY ROLE WITH JAVA SENIOR CAN BE REPLACED WITH J2EE JUNIOR

FIG. 8

| REQUEST | AVAILABLE | NEW RESULTS |
|---|---|---|
| JAVA DEVELOPER | JAVA JUNIOR DEVELOPER | NO-MATCH (R1) |
| JAVA DEVELOPER | JAVA SENIOR DEVELOPER | MATCHES (R2) |
| JAVA DEVELOPER | J2EE DEVELOPER | MATCHES (R3) |
| JAVA SENIOR DEVELOPER | J2EE JUNIOR | DEVELOPER MATCHES (R4) |
| JAVA PROGRAM MANAGER | JAVA MANAGER | NO-MATCH (NO SYNTACTICAL OR DEFINED RULES) |

FIG. 9

|  | WR TYPE A | WR TYPE B | WR TYPE C |
|---|---|---|---|
| $PC_1$ | 0.9 | 0.7 | 1.2 |
| $PC_2$ | 1.4 | 1.0 | 0.8 |
| $PC_3$ | 0.6 | 1.3 | 0.7 |

FIG. 10

|  | WR TYPE A | WR TYPE B | WR TYPE C |
|---|---|---|---|
| $PC_1$ | 0.8 | 1.0 | 1.2 |
| $PC_2$ | 1.4 | 0.7 | 0.8 |
| $PC_3$ | 0.9 | 1.0 | 0.7 |

FIG. 11

|  | $PC_1$ | $PC_2$ | $PC_3$ | $PC_4$ |
|---|---|---|---|---|
| $PC_1$ | 1 | 1.2 | 1.3 | 1.3 |
| $PC_2$ | 1.2 | 1 | 1.5 | 1.5 |
| $PC_3$ | 1.15 | 1.3 | 1 | 1.4 |
| $PC_4$ | 1.3 | 1.4 | 1.5 | 1 |

|  | QUALITY | RISK | UNIT COST |
|---|---|---|---|
| $PC_1$ | 5 | 4 | 200 |
| $PC_2$ | 7 | 8 | 100 |
| $PC_3$ | 9 | 6 | 100 |

|  | ALLOCATION OF THE 4 $WRs$ | PROJECT DURATION |
|---|---|---|
| $OPTION_1$ | 1, 3, 2, 3 | 140 |
| $OPTION_2$ | 1, 3, 2, 1 | 99 |
| $OPTION_3$ | 2, 3, 2, 3 | 160 |

FIG. 15

| WORK REQUEST | WORK REQUEST TYPE | $E_b$ : BASE ESTIMATE | $D_b$ : BASE DURATION | PC ASSIGNED | COLLABORATING PC's | $A_{CN}$ : NET COLLABORATION ADJ. FACTOR | $A_P$ : PRODUCTIVITY FACTOR | $E_e$ : EFFORT ESTIMATE | $D_e$ : DURATION ESTIMATE |
|---|---|---|---|---|---|---|---|---|---|
| WR 1 | A | 10 | 40 | $PC_1$ | $PC_2$ | 1.2 | 0.8 | 9.6 | 36 |
| WR 2 | A | 15 | 10 | $PC_3$ | NONE | 1 | 0.9 | 13.5 | 6 |
| WR 3 | B | 25 | 20 | $PC_2$ | $PC_1$, $PC_3$ | 1.44 | 0.7 | 25.2 | 20 |
| WR 4 | B | 18 | 60 | $PC_3$ | $PC_3$ | 1 | 1.0 | 18.0 | 78 |

FIG. 16

| OPTION | COST | DURATION |
|---|---|---|
| $OPTION_1$ | 7590 | 140 |
| $OPTION_2$ | 10470 | 99 |
| $OPTION_3$ | 7070 | 160 |

US 8,464,263 B2

SCHEDULING WORK REQUESTS TO PERFORMING CENTERS BASED ON OVERALL COST AND DURATION OF MULTIPLE ASSIGNMENT OPTIONS

FIELD OF THE INVENTION

The present invention relates to the electrical, electronic and computer arts, and, more particularly, to distributed software development and the like.

BACKGROUND OF THE INVENTION

Software service providers develop custom solutions to meet their customers' requirements. Large customers can typically contract out multiple projects to the same vendor, which runs the projects assigned to them simultaneously. Large providers are increasingly using a distributed (global) model for software development (delivery) wherein they can leverage the skills and cost-advantages of different sites to deliver the projects effectively and efficiently, for which project coordination with accurate information is of central importance.

One exemplary prior art approach is set forth in U.S. Pat. Re. No. 38,633, which is directed to an automated, electronic network based, project management server system. In particular, an Auto Multi-Project Server System automates the tasks of Project Management Coordination, for organizational work-group team members. The Auto Multi-Project Server, referred to as AMPS, consists of a core piece of software running on a host server computer system and interacting with a messaging system such as electronic mail, fax etc. Once the AMPS system is configured for the work environment, all interactions with it by work-group team members are via messages. First the AMPS system compiles multi-project plans into a multi-project database, and tracks the ownership of projects, tasks and resources within the plans. Second the AMPS system performs automatic checking of resource requests, if resource availability limits are exceeded then resources are re-allocated to projects based on priorities, and project plans are accordingly changed Third the database is processed periodically to send out reminder follow-ups and project status reports. Fourth the databases are continuously updated based on status changes reported by work-group members. These four steps are continuously repeated enabling an automated method of multi-project management for organizational work-group team members.

SUMMARY OF THE INVENTION

Principles of the invention provide techniques for scheduling and assigning standardized work requests to performing centers. In one aspect, an exemplary method (which can be computer-implemented) for allocating work requests to performing centers includes the step of generating options for assigning the work requests to the performing centers. The options are based upon predetermined historical factors capturing work request characteristics and performing center characteristics. Also included is, for each of the options, scheduling the work requests to determine a corresponding duration of the work requests; for each of the options, computing an overall cost; and selecting one of the options based on the overall cost and the corresponding duration.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (ii) a combination of hardware and software modules; any of (i)-(iii) implement the specific techniques set forth herein, and the software modules are stored in a tangible computer-readable storage medium (or multiple such media).

One or more embodiments of the invention may offer one or more of the following technical benefits:

1. novel techniques to factor in the impact of relationships among Performing Centers.
2. novel techniques to factor in the impact of relationships among Work Requests These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 2 is a table showing exemplary pertinent material for an organization with four performing centers and their available skill capacities in person years;

FIG. 3 is a table showing exemplary available skill capacities related to Java programming and testing, for the four performing centers of FIG. 2;

FIG. 4 is a table showing exemplary available capacities for the four performing centers of FIG. 2;

FIG. 5 summarizes pertinent notation employed herein;

FIG. 6 is an exemplary table of select features and their possible values;

FIG. 7 is an exemplary table of relations between features and/or feature values;

FIG. 8 is an exemplary table of new matching results enabled by relations;

FIG. 9 is an exemplary duration adjustment factor matrix;

FIG. 10 is an exemplary productivity adjustment factor matrix;

FIG. 11 is an exemplary table of collaboration adjustment factors between performing centers;

FIG. 15 is a table showing an exemplary cost calculation for Option 1 of FIG. 14;

FIG. 16 is an exemplary table of final allocation options with duration and cost for human decision making;

DETAILED DESCRIPTION OF PREFERRED EMBODIMENTS

Aspects of the invention have applicability, for example, in the setting of distributed software development and remote information technology (IT) services delivery. In IT services (including software development, IT infrastructure services, knowledge process outsourcing (KPO), and/or business process outsourcing (BPO) type services), the service is typically broken up into (or comprises) a set of work requests (also known as tasks), and each work request (or group of work requests) is handed out to some team or individual to perform.

Effective governance of distributed software development is a challenge One or more embodiments of the invention effectively address one or more of the following common problems: difficulty in estimation of the task duration of effort or staffing required, consequent time and cost overruns, difficulty in leveraging and reusing code and capturing knowledge, and the like.

In an illustrative example, the requested service includes a set of tasks (Work Requests, abbreviated as WR) based on standardized templates (Work Request Type). WRs can be hierarchical. Each WR is assigned to a Resource Unit (RU) which is a team that executes the WR. RUs can also be hierarchical.

One or more embodiments of the invention is provide a System and Method for optimizing delivery in distributed software development and IT services delivery, which includes a data model and an optimal assignment and scheduling method using the data model. Note that mention of "optimization" or "optimal" is not intended to limit the invention to cases where a "perfect" solution is achieved; on the contrary, cases where improvement short of perfection is attained are also considered to be within the scope of the invention.

The data model is employed for capturing and parameterizing relevant multiple objectives, for example, quality of deliverables, effective utilization of labor, end to end project duration, and total costs and risks, as well as multiple considerations including dependencies between WRs, communication and co-ordination costs between RUs, and the like.

Figure 1:
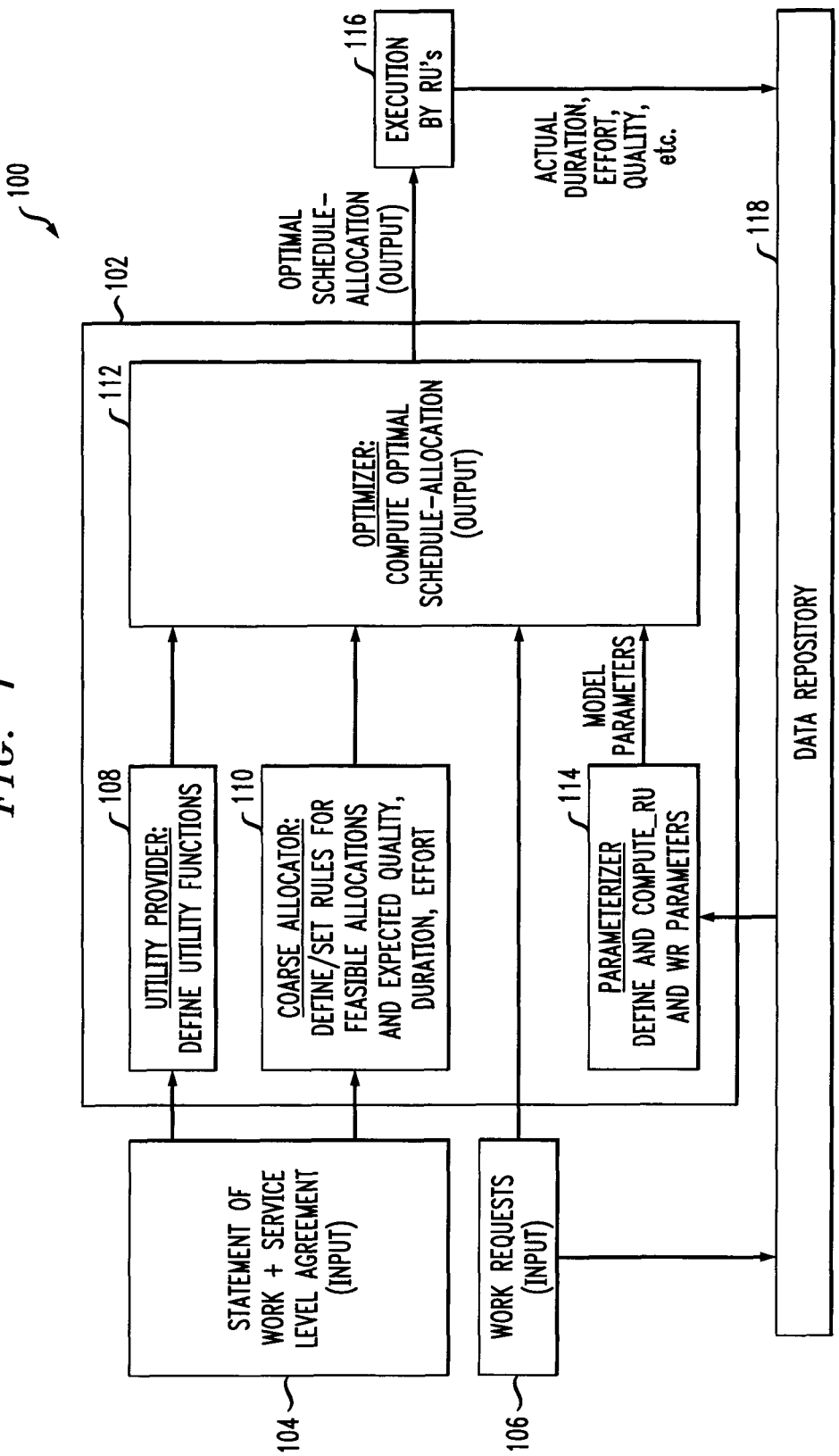
FIG. 1 shows a system block diagram of an exemplary system, also indicative of processing flow within the system, according to an aspect of the invention.

FIG. 1 shows a system block diagram 100 of an exemplary system 102 and related elements; diagram 100 is also indicative of processing flow within the system. Parameterizer 114 is employed for capturing and parameterizing relevant multiple objectives for handling WRs and managing RUs in service supply chains. Hierarchies of WRs and RUs, characteristics of WRs and RUs, and modeling of the complex interactions between WRs and RUs given the hierarchies and characteristics are discussed below. Parameterizer 114 can be extended, for example, to application development and/or ticket based services delivery (Infrastructure Services, KPO, BPO, and the like).

An exemplary hierarchy of WRs includes project, subproject, summary task, and task, as well as simple tickets and complex tickets. An exemplary hierarchy of resource units includes delivery center, competencies, teams, and subteams.

WR characteristics may include, for example skills and/or roles required to perform the WR; expected and actual effort, expected and actual duration, expected and actual quality rating, complexity; dependencies with other WRs; and the like. RU characteristics may include, for example, skills and/or competencies available; free capacities for different WR types; labor or unit costs, risk ratings, quality ratings by WR type; historical metrics on productivities, durations to complete by WR type; and the like.

With regard to WR-RU interaction characteristics, advantageously, a model is provided for predicting the impact on effort and duration of WRs of performing one WR in one RU and a dependent WR in another RU.

Aspects of optimizer 112, and related components, will now be discussed. In a non-limiting exemplary embodiment, define a utility function with utility provider 108; for example, define a utility function based on the statement of work (SOW) and service level agreement (SLA), taken as inputs, as shown at block 104. Collect data on WR that came in, as shown at block 106, their allocations to resource units, metrics relating to their execution (quality, on time performance, effort, and so on) and store in repository 118. Identify feasible allocations of WR to RUs; for example, based on matching RU parameters and WR parameters; for example, using coarse allocator 110.

Furthermore, in the non-limiting exemplary embodiment, optimizer 112 computes an optimal allocation and schedule. This can be carried out, for example, by identifying multiple feasible assignments of WR to RU ("WR-RU") based on compatibility of RU and WR parameters; identifying the constraints on schedule based on relationships between WRs; and using an optimization technique to find the allocation and schedule that optimizes the utility. All three of these steps are preferably performed exclusively in optimizer 112. A non-limiting example of an optimization technique is provided in the sections below entitled "WR Allocation and Schedule Generation," "Effort and Cost Estimation," and "Overall Optimization."

With regard to dynamic re-allocation, at any point in time, apply dynamic optimization techniques to dynamically re-optimize the schedule and re-allocate any WRs that have not been completed.

The optimal schedule allocation is executed by the RUs, as shown at block 116, and data on actual duration, effort, quality, and so on is stored in repository 118.

Further details will now be provided with regard to the exemplary system components. Data repository 118 collects and store metrics related to what is to be performed (WRs), by whom items are performed by (RUs), and how items are performed (for example, quality, effort, and/or duration). Utility provider 108 defines the utility functions. Such functions should factor in criteria related to the output of a WR (such as quality), how the WR was performed (such as cost, effort, and/or duration), impact on RU (such as capacity utilization) as well as criteria related over any group of WR in the scope of the SOW (such as overall project duration). Parameterizer 114 conducts WR and RU parameterization; for example, it learns WR parameters, RU parameters and WR-WR, RU-RU and WR-RU interaction parameters from historical data.

Consider now exemplary utility definition, data collection, and allocation method details for IT services or IT enabled services. With regard to exemplary characteristics of utility functions, utility is defined over a set of WR falling in a given span of time and is generally an aggregate of the parameters on the individual WRs in that span of time. The utility function can include a penalty dependent on the fraction of WR not closed on time. In at least some instances, completion of the WR within a pre-defined duration is important. WR typically must be allocated immediately when they are received and completed in a short duration.

With regard to data collection and parameterization, in one or more embodiments, track the free capacity of each RU to determine the feasible allocation of the WR to the RU; and track the execution performance (for example, fraction of WR not closed on time, customer satisfaction ratings) relative to the utility function. As far as allocation and scheduling, in one or more instances, determine the risk of breaking the SLA and expected penalty due to the allocation, and select the RU for which the expected utility is maximized.

An exemplary embodiment for application development services will now be discussed. Data repository 118 captures WR type; RU assigned; expected and actual duration; expected and actual effort; dependencies; and/or defect rates on new, ongoing and completed WRs. The applicable WR hierarchy is project, sub-project, phase, summary task, and task. Utility provider 108 defines the utility function; utility functions are a combination of total cost for all work requests, total duration of project, and average defect rates across WRs.

With regard to the parameterizer 114, explanation will now be provided regarding the WR-RU paremeterizations. With regard to WU-RU parameterization, compute the stretch in effort and duration when two related WRs are performed by RU 1 and RU 2, respectively, relative to the effort and duration when instead of both together, the two related WRs are being performed by either RU 1 or RU 2. As discussed above, WR characteristics may include, for example, skills and/or roles required to perform the WR; expected and actual effort, expected and actual duration, expected and actual quality rating, complexity; dependencies with other WRs; and the like. Furthermore, as also discussed above, RU characteristics may include, for example, skills and/or competencies available; free capacities for different WR types; labor or unit costs, risk ratings, quality ratings by WR type; historical metrics on productivities, durations to complete by WR type; and the like.

Consider now characteristics for application development services. In particular, a software development project will typically include a set of work requests largely known well in advance of the date they need to be delivered. The duration is highly variable—from a day to several months—and typically, dependencies exist between work requests (for example, work request A needs to be completed for work request B to start).

An exemplary embodiment for IT Infrastructure Services will now be described. In this instance, data repository 118 captures data including WR type; RU assigned; expected and actual duration; and/or customer satisfaction ratings on new, ongoing and completed WRs. Furthermore, utility provider 108 defines the utility function; such functions may include, for example, an average of the following over an interval such as a month: time to start work requests; time to complete work requests relative to expected time to complete as per SLA; customer satisfaction statistics based on surveys; utilization of RUs; and the like.

Parameterizer 114 handles WR and RU Parameterization. WR parameterization may include, for example, simple and/or complex type; skills and/or roles—who can perform; severity or expected time to complete; and the like. Furthermore, WR parameterization also addresses WR types, available capacities, productivities, quality and customer satisfaction ratings or statistics for different WR types. RU parameterization may include, for example, types of WRs that can be handled, available capacity, risk ratings, customer satisfaction ratings (quality), and the like. In addition, WR-RU parameters may include, for example, scale factors that quantify the effect on time-to-complete when different WRs of the same type are handled by more than one RU, either simultaneously or in shifts.

It should be noted that in typical IT infrastructure services, the WRs are generated on an ongoing basis and need to be attended to almost right away (hours to a few days), and most WRs are not composed of smaller interdependent WRs.

One or more embodiments of the invention thus provide a system to assign and schedule standardized work requests to performing centers, in service supply chains, having one or more of the following characteristics: work requests (WRs) are allowed to be built from other WRs, work requests can have dependencies, and resource units (RU) can be formed from smaller RUs.

Furthermore, one or more embodiments of the invention provide a parameterizer, such as parameterizer 114, for capturing and parameterizing relevant multiple objectives for handling WRs and managing RUs. Such parameterizer may have one or more of the following characteristics: WR are described by multiple parameters; RUs are described by multiple parameters; and the interactions between WRs and RUs are described by a model discussed hereinbelow.

As just noted, in one or more embodiments, WR are described by multiple parameters; these may include, for example, skills and/or roles required to perform the WR; expected and actual effort, expected and actual duration, expected and actual quality rating, complexity; and dependencies with other WRs. Furthermore, RUs are described by multiple parameters; these may include, for example, skill and/or competencies available; free capacities for different WR types; labor or unit costs, risk ratings, quality ratings by WR type; and historical metrics on productivities, durations to complete by WR type. Yet further, in one or more embodiments, the interactions between WRs and RUs are modeled using a model for predicting the impact on effort and duration of WRs of performing one WR in one RU and a dependent WR in another RU.

In another aspect, an exemplary method, based on the data model, assigns and schedules standardized work requests to performing centers. The method includes categorizing WR into standard types; associating WR types to RU based on capabilities of RUs; and collecting data. The data includes work requests that came in, and the dependencies between them; assignments that were made; and performance of performing centers on execution of work requests (duration, effort expended, quality of execution).

An additional step includes defining several scores or metrics that characterize performing centers for each type of work request, these scores or metrics may include, for example, scores or metrics that are project schedule related (for example, overall duration); performing centers related (for example, productivity, on-time performance, collaboration ease); or work requests related (e.g. importance or urgency, defect rates, user satisfaction, actual and estimated duration and effort); furthermore, the metrics may be at varying levels of granularity or may be aggregates over groups of work requests or aggregates over work requests in a finite time interval.

Further steps include defining an overall optimization criteria using these metrics; and applying an optimization technique to optimize the schedule and assignment jointly. Optionally, an additional step for a project that is underway, at any point in time, is to apply dynamic optimization techniques to dynamically re-optimize the schedule and re-assign for WRs that have not been completed.

In one or more embodiments, in the consideration of the metrics, optimization criteria can include, for example, the duration to execute a work requests, or quality of completed work requests, either individually or aggregated over a group of work requests; the effort and cost expended in delivering one work request or a group of work requests; the utilization of free capacity of performing centers; and the penalty or expectations as stated in a contract or statement or work.

Elements 108, 110, 112, and 114 can be implemented, for example, as distinct software programs or software modules written in a general purpose programming language such as, for example, C++ or Java running on a general purpose server, or, for example, as distinct software programs or software modules written in a specialized programming language that is specialized for optimization, such as CPLEX or Matlab and running on a general purpose server. Element 118 can be implemented, for example, using standard database products such as DB2, Oracle, Sybase, etc. or, for example, as one or more text files in a format such as comma separated values (CSV) or extensible markup language (xml) and stored on a general purpose storage connected to a general purpose server. CPLEX is available from ILOG, an IBM company (International Business Machines Corporation, Armonk, N.Y., USA). Matlab is available from The Math Works, Inc., Natick, Mass., USA.

Embodiments of the invention address the challenges in effective project coordination for a customer across multiple projects with distributed performing centers. One or more embodiments employ standardized metadata, schedule and resource management, and measurements for project monitoring. Instances of the invention provide a framework for global project management and governance to addresses the identified challenges, and also take current project tools into perspective. One or more embodiments extensively leverage historical data gathered on metrics pertaining to different types of work requests.

Software service provider organizations develop custom solutions to meet their customers' requirements. Large customers can typically contract out multiple projects, which may run simultaneously, to the same provider. The drive for productivity improvements has lead providers to organize manpower into teams, where each team is capable of efficiently handling certain types of work. The skill mix of the team is based on the kind of work to be handled. In an IT consulting organizational setting, the work description is varied. Herein, a unit of work is referred to as a work request (WR).

Due to the increasing ease of collaboration across geographies and time zones, large providers are increasingly using a distributed (global) model for software development (delivery) to meet the demands, wherein they leverage the skills and cost-advantages of different performing centers (PCs) to deliver projects effectively and efficiently. The terms performing centers (PCs), sites, resource units (RUs), and locations are used synonymously herein.

Project management deals with tracking and coordinating tasks in a project so that the entire project is completed on time and within budget. Prominent tools for project management are IBM Rational® Portfolio Manager software (registered mark of International Business Machines Corporation, Armonk, N.Y., USA); Open Workbench software; and Microsoft Project software. In order to seamlessly service large customers, project coordination with accurate information is quite significant.

In at least some instances, the project coordination problem is two-fold:
1. For every project, match and assign WRs to PCs that can handle them.
2. While determining appropriate assignments, optimize the overall global delivery organization with respect to its PCs' capabilities and overall metrics across all projects.

Advantageously, one or more embodiments of the invention limit costs associated with team building and knowledge transfer, create a software product architecture that can be easily distributed and that minimizes cross-site communication, and facilitate communication among remote teams; yet such embodiments also optimize global resources.

One or more embodiments:
formalize the problem of coordination across multiple projects and PCs as a global project management framework (GPMF)
provide standardized metadata, schedule and resource management and measurements for project monitoring
provide an effective approach to project coordination that addresses the identified challenges
make use of historical data gathered on metrics.

Global Project Management Framework (GPMF) Setting

Consider a large and globally distributed multi-site software development organization. Each of its PCs has multiple broad specialties or competencies, the choice of which has been based on demand for various skills and the locally available talent pool. For a given competency, different PCs differ in their practitioners' experience mix and process maturities.

A project is broken down into smaller units or WRs that can be split among different teams, either collocated or geographically distributed. Creating standard types of WRs allows work to be efficiently allocated to and performed by remote teams in PCs whose capabilities are well defined in terms of these standard WR types (by object oriented programming convention, a WR type can be seen as a class and a specific WR as an instance of it.). The following criteria are followed:
1. A WR must be an instance of one of the previously existing WR templates or the instance of a newly designed template.
2. A WR can be assigned to one and only one PC.
3. For a WR, dependencies are specified but not the specific start dates and the end dates.

Exemplary Scenario

Consider a simple example of an organization with 4 PCs—two in Bangalore (Blr1 and Blr2), one in Beijing, and one in New York, and having only two competencies as depicted in the table of FIG. 2 (organization with 4 PCs and their available skill capacities in person years). Each competency has practitioners drawn from one of several job roles-skills sets as illustrated. The two competencies are application development (Java) and mainframe related work. In the first competency, there exist three job roles: developers, testers and analysts. In the second competency, four roles are listed: tech-leads, COBOL developers, AS 400 developers and testers. Now, consider three types of WRs: maintain application ($WR_0$), maintain application-code ($WR_1$) and maintain application-test ($WR_2$). The first one maintains applications developed in Java along with testing. Every instance of this type requires two Java developers and three testers. The second one deals with only application code written in Java. Its instances need two Java developers.

The last WR type is meant for maintaining test plans and test cases. A typical instance of this WR type requires three testers. Consequently, $WR_0$ is equivalent to $WR_1$ plus $WR_2$ ($WR_0=WR_1+WR_2$). The free capacity of each PC may be described in terms of the number of WRs that can be further taken up. In Blr1, five of the Java developers are already assigned to different projects. All the Java testers in Blr1 are already engaged. Similarly, in Blr2, no Java developers are available for the current project but the testers are available. In Beijing, four Java developers and all six testers are looking for work. Finally, in New York, four Java developers and nine testers are still available. Just to show the relevant and available job roles, refer to the table of FIG. 3 (the 4 PCs and their available skill capacities (bench) related to Java programming and Java testing in person years). The table of FIG. 4 shows the available capacities (in WR units) of each PC for these WR Types. $WR_0$ can be allocated to either Beijing or New York based on the available capacity. However, if broken up into the two sub-requests, there is more flexibility available in assigning the WRs. For example, Blr1 and Blr2 can undertake $WR_1$ and $WR_2$ respectively.

SPM Tools and GPMF

Standard project management (SPM) tools have limited usability in GPMF. Assume $WR_0$ is broken into $WR_1$ and $WR_2$. In other words, only columns 3 and 4 are relevant in FIG. 4. These two WRs could be allocated to the four PCs in 16 ways ($2^4=16$). However, Blr1 cannot handle $WR_2$ and Blr2 cannot take up $WR_1$. Consequently, the choices are reduced to 8. When using other aspects like metadata matching, collaboration scores, risk, quality, productivity, etc., the choices will be further reduced and the problem of WR allocation may become tractable even though it is NP-Hard. Assume for illustrative purposes that only the following three allocations make sense:

Allocation $A_1$: ($WR_1$, Blr1), ($WR_2$, Blr2); Schedule: $WR_1$: January 10-March 10, $WR_2$: March 10-April 25

Allocation $A_2$: ($WR_1$, Beijing), ($WR_2$, Beijing); Schedule: $WR_1$: January 10-March 10, $WR_2$: March 10-April 25

Allocation $A_3$: ($WR_1$, NY), ($WR_2$, NY); Schedule: $WR_1$: January 10-March 10, $WR_2$: April 10-May 25

There are two ways current project management tools can be used in one or more embodiments of GPMF; namely, manually allocating WRs to PCs, using SPM tools within a PC; and using SPM tools to analyze allocation of WRs to PCs (post-facto).

Manually Allocate WRs to PCs, use SPM Tools within a PC

Once the WRs are allocated to different PCs, the PCs can manage their respective WRs using the SPM tools, by exchanging vital information like skills required, schedule dates, and the like. For example, according to allocation $A_1$, PC Blr1 is assigned $WR_1$. The project manager of Blr1 can create a corresponding project using IBM Rational® Portfolio Manager software ("RPM software"), with planned start date set to January 10, and planned due date set to March 10. Further, he can allocate the corresponding resources looking at the skills required for $WR_1$.

Use SPM Tools to Analyze Allocation of WRs to PCs (Post-Facto)

SPM tools can be used to calculate the optimality of an allocation of WRs to PCs in GPMF. This can be done by replicating the WR and PC information (e.g. dependencies between WRs) in the SPM tool and calculating the overall project duration. By way of illustration, in order to calculate the schedule optimality score of allocation $A_1$, create a new project in RPM software, with two tasks, $WR_1$ and $WR_2$. Create the dependency between the tasks and two resources Blr1 and Blr2. Create the corresponding resource task assignments. Call the function "calculate" for this project to find the schedule dates. The overall duration of the project (i.e. the difference between planned start date and due date) will give schedule optimality score for $A_1$.

Factors in Allocation of WRs to PCs

Generally each PC specializes in some areas depending on the local availability of skills. The PCs also differ in multiple aspects. When the number of PCs is large, a project manager who is trying to do the assignment of WRs to PCs needs guidance (possibly via some decision support matching tool). The typical factors involved in this decision are:

Capabilities of PCs: Capabilities of PCs may be described in terms of types of WRs they can execute, or in terms of the skills of the practitioners, or a combination. Skills many include technical, managerial, domain and language skills.

Performance, Quality, and Risk Ratings: These include
Historical performance metrics of each PC for various work request types, including productivity and on-time performance related metrics (a non-limiting example of a productivity metric is given in A. S. Duncan, Software development productivity tools and metrics, ICSE '88: Proceedings of the 10th international conference on software engineering, pages 41-48, 1988; the skilled artisan will be familiar with same, and given the teachings herein, can adapt same for use with one or more embodiments of the invention)

End quality rating; for example in terms of defect rates (a non-limiting example of such a rating is given in S. H. Kan, Metrics and Models in Software Quality Engineering, Addison-Wesley Longman Publishing Co., 1994; the skilled artisan will be familiar with same, and given the teachings herein, can adapt same for use with one or more embodiments of the invention)

Operational risk associated with the PC (a non-limiting example of such a risk rating is given in M. Leippold and P. Vanini, The quantification of operational risk, The Journal of Risk, 8, October 2005; the skilled artisan will be familiar with same, and given the teachings herein, can adapt same for use with one or more embodiments of the invention)

Collaboration Factors: Dependencies between WRs imply a need for collaboration between the PCs handling those WRs. To make collaboration easier, the capabilities of PCs should be planned such that each PC can execute connected types of WRs, or at least PCs in approximately the same time zone should together have this capability Capacity Constraints: Capacity constraints include the availability of skills and teams at the appropriate time. The scheduling of the WRs should be done simultaneously with their allocation to PCs, to ensure that the necessary free capacity is available and can be reserved at the assigned PC.

A Method to Allocate WRs to PCs

Enhanced Data Model for GPMF

Standardization of work specifications and breaking up of a project into a set of WRs, each of which (or as many of which) are based on the standardized specification (or template), allows for better governance of current work based on historical records relating to work of similar nature. Each template has the information needed to determine estimates of effort and duration for executing the WR for some assumed reference PC. These estimates are denoted as the base effort and base duration. However, variations due to the choice of PC assigned to execute a WR need to be factored in separately. To capture this effect, one or more embodiments of the invention employ three "adjustment" factors to capture variations in effort and duration due to the choice of PCs. Applying these adjustment factors to the base effort or duration generates the estimated effort and duration, respectively. Using the notation in the table of FIG. 5, one or more embodiments employ the following adjustment factors, which are computed from historical data:

Duration Adjustment Factor $A_D$: The actual duration of execution of each WR is known once the WR is completed. The ratio of this actual duration $D_a$ to the base duration $D_b$, averaged over a number of completed work requests of type t that were assigned to a PC p, captures the variation in duration due to choice of the PC and is defined as:

$$A_D(t,p) = \text{Average}(D_a/D_b). \quad (1)$$

Duration adjustment factors are captured for each (WR Type, PC) pair and represented as a matrix. An example duration adjustment factor matrix is shown in the table of FIG. 9.

Productivity Adjustment Factor $A_P$: The actual effort (in person-days for example) involved in the execution of each WR is known once the WR is completed. The ratio of this actual effort $E_a$ to the base effort $E_b$, averaged over a number of completed work requests of type t that were assigned to a PC p, captures the variation in effort due to choice of the PC and is defined as:

$$A_P(t,p) = \text{Average}(E_a/E_b). \quad (2)$$

Productivity adjustment factors are captured for each (WR Type, PC) pair and represented as a matrix. An example productivity adjustment factor matrix is shown in the table of FIG. 10.

Collaboration Adjustment Factor $A_C$: When there are dependencies between two WRs, a certain amount of collaboration is needed between the two PCs working on those WRs. Typically, this adds a certain amount of overhead in effort. This increase in effort depends on the ease of collaboration between the two PCs, which is a function of geographic and time zone distances as well as cultural differences including language and holiday calendars. To compute Ac for a pair of PCs $p_i$ and $p_j$, look at the WR instances x for which x was in $p_i$ and a dependent WR y was in $p_j$. $E_a(X)$ is the actual effort expended on x. Let $E_e(X)$ denote the estimated effort if y was also in $p_i$. The ratio $E_a(X)/E_e(x)$ captures the impact of y being in $p_j$ rather than being in the same PC. The collaboration adjustment factor is defined as:

$$A_C(p_i,p_j) = \text{Average}(E_a(x)/E_e(x)) \quad (3)$$

where the average is over all such WR instances x and y. An example collaboration adjustment factor matrix is shown in the table of FIG. 11.

Technique Summary

An exemplary for allocating WRs to PCs, factoring in the considerations of the previous section, will now be described. The allocation problem is inherently a partitioning problem. A good discussion on it can be found in B. Hayes, The easiest hard problem, American Scientist, 2002; the skilled artisan will be familiar with partitioning per se, and, given the teachings herein, will be able to adapt techniques, such as those described in the Hayes article, to implement one or more embodiments of the invention.

Figure 17:
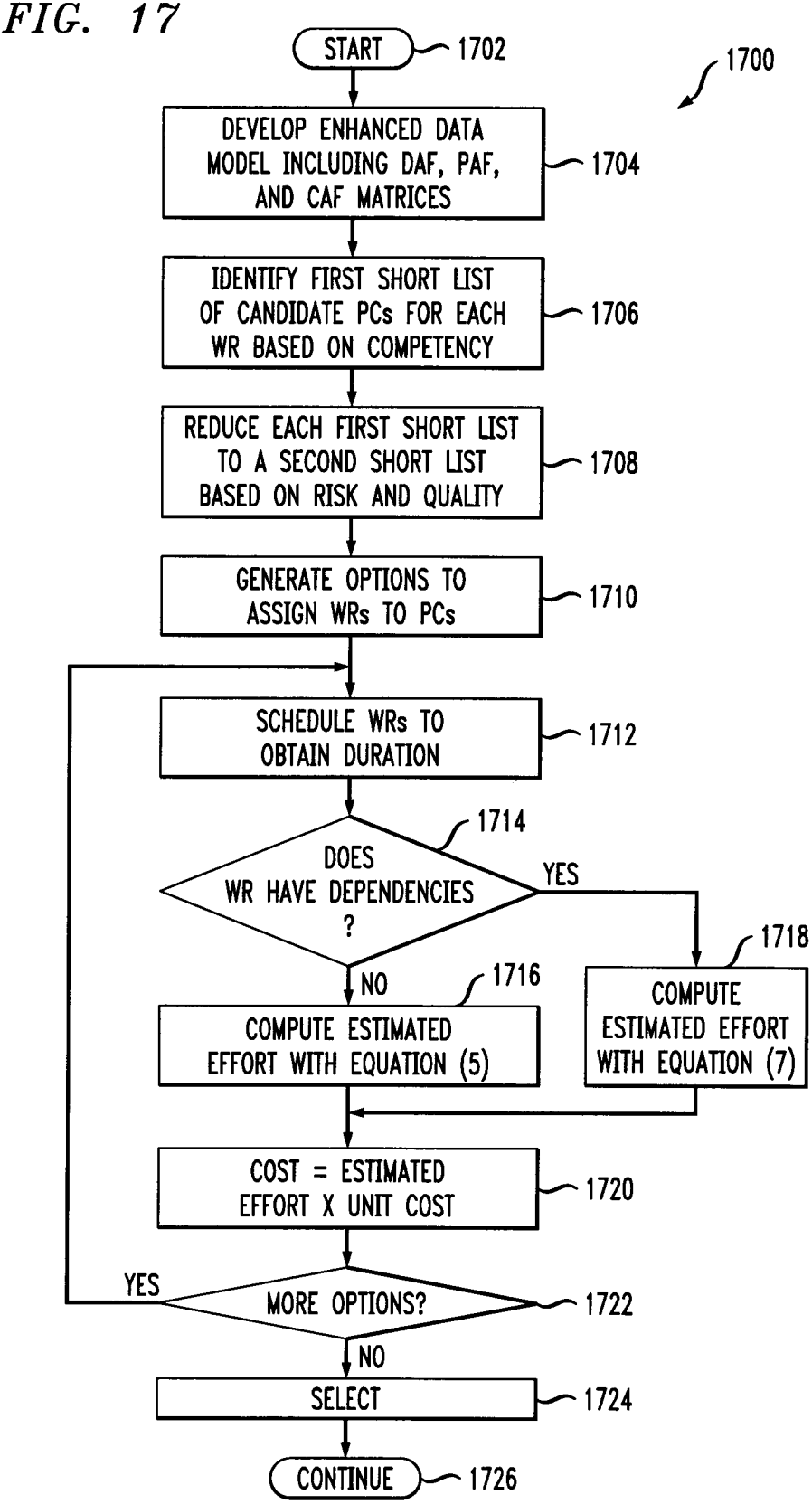
FIG. 17 presents a flow chart of exemplary method steps, according to another aspect of the invention.

Reference should now be had to the flow chart 1700 of FIG. 17. After beginning at block 1702, optional step 1704 includes developing the enhanced data model, including duration, productivity, and collaboration adjustment factor matrices. Step 1706 includes competency based short-listing. In this step, short-list the candidate PCs for each WR by matching capabilities. Capabilities are represented using meta-data, as discussed below in the section on Metadata Matching.

Step 1708 includes risk and quality based short-listing. In this step, further short-list PCs based on minimum acceptable ratings of quality and risk. An additional step includes WR allocation and scheduling. In this step, generate multiple possible options and/or ways of assigning WRs to PCs, as in block 1710, and for each option, schedule the WRs, as in block 1712. This is discussed in more detail in the section below on WR Allocation and Schedule Generation.

A further step includes cost optimization. As will be discussed further below, one way to carry out such step is shown in blocks 1714-1722. In this step, for each assignment option determined in step 1710, estimate the effort, factoring in collaboration overheads and productivity ratings. Factor in labor rates to compute the overall cost for each allocation option. This is discussed in detail in the section below on Effort and Cost Estimation.

A still further step 1724 includes Overall Optimization. In this step, among the several Allocation Options determined in step 1710, and the cost of each as determined in the cost optimization step, select the best combination of overall cost and overall duration. This is discussed in detail in the section below on Overall Optimization.

Note that the steps in the exemplary method are described in a logical order; however, embodiments of the invention are not necessarily limited to steps performed in this exact order; other logical sequences may be employed.

Technique Details

Metadata Matching

In this section, consider a problem that has significant ramifications for large scale project coordination; namely, how to describe things unambiguously and meaningfully. Consider whether, when WRs have to be assigned to PCs, the descriptions of the WRs and the capabilities of the PCs are consistent. Furthermore, consider, when jobs and skills are matched, whether they give intuitively correct results.

If there are a few well-defined WR types and a few nicely structured PCs, metadata need not be essential at all. In large globally distributed projects, normally expect hundreds of WRs which are instances of scores of WR types. As a result, many PCs participate in project execution. First, metadata is helpful in identifying which types of WRs are already available in a repository. By looking at the vague initial descriptions of requirements themselves, pull out clearly articulated work with the help of metadata. Second, given the available resources (available) at a PC, by mixing and matching, metadata is helpful in discovering which WRs can be easily executed. Finally, metadata is useful when new WR types are defined and when it is desired to identify which PCs can be assigned to the new WR types. Large PCs contain hitherto hidden capabilities of executing new WR types.

Data description, or metadata, conveys information about things in the domain, such as names and their properties. It applies to all aspects of project management including WRs, PCs, job roles, skills, time lines and measurements. Metadata can be resolved if all parties agree to a common standard. However, standards are hard to arrive at when a service provider is serving multiple customers in different industries and different geographies, having different needs.

In one or more embodiments, metadata includes two parts: (i) the concepts or features, and (ii) the relationship among the features. Taxonomies and glossaries standardize the features and are easier to build. Consider the project management scenario of the table of FIG. 6, where select technical areas and skills are enumerated as a taxonomy. The skill prefix can be used along with the skills to define a skill level of a resource, e.g., Junior Developer. The symbol ⊥ represents no prefix. Having a taxonomy is valuable because concepts used in project management can be precisely represented and reasoned with. Thus, a request for a resource in a WR and the capability of a PC can use specific technical areas and skill levels without ambiguity.

While taxonomies standardize the features, they do not define relationships. Thus, a request for a Java Developer will not match a PC which has Java Senior Developer. Now consider relations of the table of FIG. 7 between the feature values. Some relations are generic while others are specific to technology-based reasoning. With these relations, new types of metadata matching results are possible, as shown in the table of FIG. 8.

A general scheme which formalizes both the features along with their values and relationships is called an ontology. The skilled artisan will be familiar with this concept, per se, from, for example, the Web Ontology Language (OWL). Ontologies are hard to build and even harder to agree to among different parties; the skilled artisan will be aware of this from, for example, M. F. Lopez, Overview of methodologies for building ontologies, Proceedings of the IJCAI-99 workshop on Ontologies and Problem-Solving Methods, Stockholm, Sweden, 1999. In terms of technology, taxonomy can be efficiently implemented in a relational database while ontology management systems are relatively new and have additional overhead. In one or more embodiments, for project coordination, a mixed approach is employed, where well-defined taxonomies define features and the relationships are defined based on specific usage scenarios. Given the teachings herein, the skilled artisan will be able to adapt aspects of OWL and/or the Lopez article to implement one or more embodiments of the invention.

WR Allocation and Schedule Generation

When a WR is allocated to a PC, the duration the PC will take to execute it is estimated by multiplying its base duration by a duration adjustment factor. For each allocation, the time to deliver each WR is computed as follows:

$$D_e = D_b \times A_D \quad (4)$$

where duration factor is picked from a table, such as that of FIG. 9, corresponding to the WR type and PC that the WR is assigned to.

Figures 12, 13, 14:
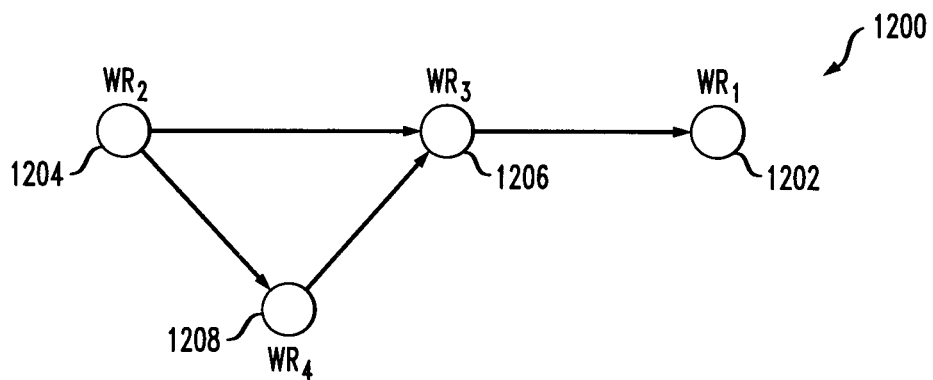
FIG. 12 shows exemplary dependencies between work requests.
FIG. 13 is an exemplary table of quality ratings, risk ratings, and unit cost.
FIG. 14 is an exemplary table of allocation options.

Next, the plan for delivering the WRs is determined by a standard project management tool such as Microsoft Project or RPM software. This plan will take into consideration the dependencies and other constraints, such as availability of resources, which constrain when a PC can start on the WR. The exemplary model has, to this point, provided the inputs for the project plan, which are the estimated effort and estimated duration. Once the plan is determined, the overall duration is also known. There may be multiple ways of assigning WRs to PCs and these multiple options are listed out. An example is shown in the table of FIG. 13. Note that the estimated durations, and not base durations, are used to develop the plan for each option.

Effort and Cost Estimation

In the exemplary third step, there may be multiple, or a large number of, possible ways of allocating WRs to PCs. Each such choice of allocation will result in a different estimated effort because of productivity differences and differences in collaboration overhead.

For a WR that has no dependencies, the estimated effort is simply:

$$E_e = E_b \times A_p(t,p) \quad (5)$$

where t is the type of the WR and p is the PC it has been allocated to.

When a WR is dependent on other WRs, there are overheads in collaborating with the teams working on these other WRs, to ensure that the requirements are clear and understood. This overhead is factored into the base effort estimate $E_b$ (assuming that all WRs are carried out in the same PC). However, when these other WRs are carried out in different PCs, the variation due to these PCs is captured via collaboration adjustment factors applied to the base effort estimate as follows: when a WR being executed in PC p is dependent on k other WRs being executed in PCs $p_{i1}, p_{i2}, \ldots, p_{ik}$, the net collaboration adjustment factor $A_{CN}$ is computed as:

$$A_{CN} = A_C(p, p_{i1}) \times A_C(p, p_{i2}) \times \ldots \times A_C(p, p_{ik}) \quad (6)$$

The estimated effort depends on both the collaboration factor applicable to the WR and the productivity factor of the PC to which it is assigned.

$$E_e = E_b \times A_{CN} \times A_p(t,p) \quad (7)$$

The cost of executing a WR is $$\text{Cost} = E_e \times \text{UnitCost} \quad (8)$$

Overall Optimization

For each combination of estimated duration $D_e$ from step 1712 and estimated cost from the cost estimation step, multiple options for allocation are obtained. The option having the best tradeoff between cost and duration and overall risk is selected. Increased duration represents an opportunity cost. The monetary impact of risk exposure depends on the criticality of the WRs. Because the tradeoff between cost, duration and risk cannot be quantified in a general way, in one or more embodiments of the invention, employ situation-specific analysis. The skilled artisan might also have an idea of what values of cost, duration or risk would be considered outside the scope of consideration or not tolerable. The skilled artisan would eliminate those options for allocation which are outside the scope of consideration. A skilled artisan can be expected be aware of the relative importance of minimizing cost versus shortening duration versus minimizing risk for their organization. The skilled artisan can rank the different options for allocation based on such relative importance.

EXAMPLE

Consider the project 1200 with 4 WRs, numbered 1202, 1204, 1206, 1208, respectively, having the finish to start dependencies as shown in FIG. 12. If there is an arrow from $WR_x$ to $WR_y$, then $WR_y$ cannot start before the finish of $WR_x$.

Also consider three PCs having duration adjustment factors AD as shown in the table of FIG. 9, productivity adjustment factors $A_P$ as shown in the table of FIG. 10, collaboration factors $A_C$ as shown in the table of FIG. 11, and quality ratings, risk ratings and cost/person-day as shown in the table of FIG. 13. In the table of FIG. 13, cost is expressed in dollars per person-day, while quality and risk ratings are on a scale of 1-10. Assume for illustrative purposes that the short-listing of the PCs based on competency, quality and risk has been done, and that, based on this short-listing, the feasible combinations or ways for assigning WRs to PCs have been identified. Three of these have been shown in the second column of the table of FIG. 14. For each of these three options, the adjusted duration for each WR is computed and then a schedule is determined based on the dependencies between WRs and other capacity constraints of PCs. The overall duration as determined by the scheduling tool is shown in the third column.

For each option, the collaborating PCs are identified and the net collaboration factor $A_{CN}$ is computed. This is illustrated in the table of FIG. 15 for Option 1. The estimated effort is computed using equation 7 and also shown in the table of FIG. 15. The final cost and final duration are shown in the table of FIG. 16. The option having the best tradeoff between cost and duration and overall risk is selected. The changes in assignments between PCs lead to changes in the duration of WR execution, which in turn changes the project duration. Changes in the assignment also affect estimated effort (due to productivity and collaboration factor changes). Finally, the cost per unit effort is also different between PCs. In Option 3, the cost is the lowest, but duration is the greatest. In Option 2, the cost is the highest but duration is the lowest. Option 1 is between the two extremes, but quite close to Option 3. Based on the opportunity cost of time, a decision can be taken on the best choice.

Compare Option 1 with Option 2, and note that the only change is in the assignment of $WR_4$. In Option 1, it is assigned to $PC_3$ and in Option 2, it is assigned to $PC_1$. $PC_1$ is costlier than $PC_3$ but takes less time for completion of $WR_4$ due to higher productivity on WRs of type B. Therefore, by moving from Option 1 to Option 2, the cost has gone up while duration has come down.

Moving from Option 1 to Option 3, the only change is in the assignment of $WR_1$; in Option 1, it was assigned to $PC_1$ and in Option 3 it is assigned to $PC_2$. Since $WR_1$ is dependant on $WR_3$ and $WR_3$ is also assigned to $PC_2$, Option 3 provides for easier collaboration between $WR_3$ and $WR_1$ and lowers the cost.

One or more embodiments of the invention thus provide a GPMF framework by extending the RPM software tool with an infrastructure to represent WRs, PCs, and the extended data model. The allocation method is available to project managers in their familiar RPM environment but as a new feature. Any framework for project coordination and governance should preferably capture and track appropriate metrics which can be used to improve the development process. Metrics of interest in one or more embodiments include: WR usage, WR size, WR execution statistics, types of WR type customization, risk and capacity related metrics.

Thus, it will be appreciated that in at least some instances, significant problems arise during project management of large accounts involving multiple and/or global locations and multiple projects. In at least some cases, challenges include standardizing metadata, schedule and resource management, and measurements for project monitoring. High productivity requires that work assignments be standardized as variants of standard templates, for which assignment can be automated by matching the standardized WR type with capabilities of teams also defined in a standardized way. This automated matching process involves consideration of primary factors, such as available capacities at various PCs, demand forecasting and capacity management in PCs, expected level of collaboration among WRs, and dependencies between WRs that lead to scheduling constraints. Secondary factors that can also be taken into consideration include quality ratings of teams and overall risk to schedule. At least some embodiments of the invention provide an approach to project coordination that addresses the identified challenges and incorporates appropriate techniques.

With reference again to flow chart 1700 of FIG. 17, it will be appreciated that, in general terms, an exemplary method for allocating work requests to performing centers includes step 1706, namely, for each of the work requests, identifying, from among the performing centers, a first short list of candidate ones of the performing centers. The identifying is carried out by matching capabilities of the performing centers against each of the work requests. The capabilities are represented as meta-data. This step can be carried out, for example, with coarse allocator 110 in FIG. 1. An additional step 1708 includes reducing each of the first short lists to a second short list, based on minimum acceptable ratings of quality and risk. Each of the second short lists includes a reduced set of the candidate ones of the performing centers capable of performing a corresponding one of the work requests. This step can also be performed, for example, with coarse allocator 110. Both short-listing steps are optional.

A further step 1710 includes generating options for assigning the work requests to the performing centers. The options comply with the second short lists. This step can also be performed, for example, with coarse allocator 110. Step 1712 includes, for each of the options, scheduling the work requests to determine a corresponding duration. A further step includes, for each of the options, computing an overall cost. A non-limiting example of sub-steps to carry out this step is depicted in blocks 1714-1722. Step 1724 includes selecting one of the options based on the overall cost and the corresponding duration. Step 1712, the overall cost computation step, can be carried out, for example, with optimizer 112. In some cases, aspects of the invention can be implemented by modifying existing software, using techniques set forth herein—for example, a modified version of RPM software. Advantageously, human operators will configure the utility function using the software, for example by choosing amongst a set of pre-defined utility function templates. The last selecting step 1724 is also preferably performed by a human. The other steps are preferably carried out on a general purpose computer, using distinct software modules configured as shown in FIG. 1. The selection of one of the options by the human when acted on will typically result in physical changes in the performing center due to triggering of appropriate human resource actions at the centers, for example hiring of additional personnel or reassignment of personnel. Thus, a step of configuring a performing center based on the selected option can also be included.

Note that in at least some instances, where step 1724 is performed by a human, apparatuses, systems, and/or computer program products in accordance with one or more embodiments of the invention may facilitate the human's performance of such step; for example, by displaying suitable choices or other data to guide the human.

In one or more embodiments, in step 1706, the metadata includes at least one taxonomy defining pertinent technical and skill features of the performing centers, and relationships among the features based on specific usage scenarios.

In at least some instances, step 1712 includes determining the corresponding duration in accordance with equation 4. Parameterizer 114 interacting with data repository 118 may assist in providing appropriate parameters to optimizer 112 to carry out this step. The duration of each of the WRs is summed to obtain the total duration for the project.

As noted above, optional step 1704 includes developing the enhanced data models. For example, this may include determining a plurality of values of $A_D$ based on equation 1; determining a plurality of values of $A_P$ (t, p) based on equation 2, and/or determining the individual collaboration adjustment factors in accordance with equation 3. These steps may be carried out by parameterizer 114 drawing on historical data in repository 118, for example.

With reference to blocks 1714-1722, cost computation can include, as at block 1714, determining if a particular WR has dependencies. If this is not the case, use equation 5 to compute the estimated effort, as at block 1716. If the WR does have dependencies, use equation 7 to compute the estimated effort, as at block 1718. In either case, calculate the cost as the product of the estimated effort $E_e$, and a unit cost, as in step 1720. The cost for each of the WRs is then summed to obtain the total cost for the project. Continue for all options identified in step 1710, as per the decision block 1722. Steps 1714-1722 can be carried out, for example, with optimizer 112.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 18:
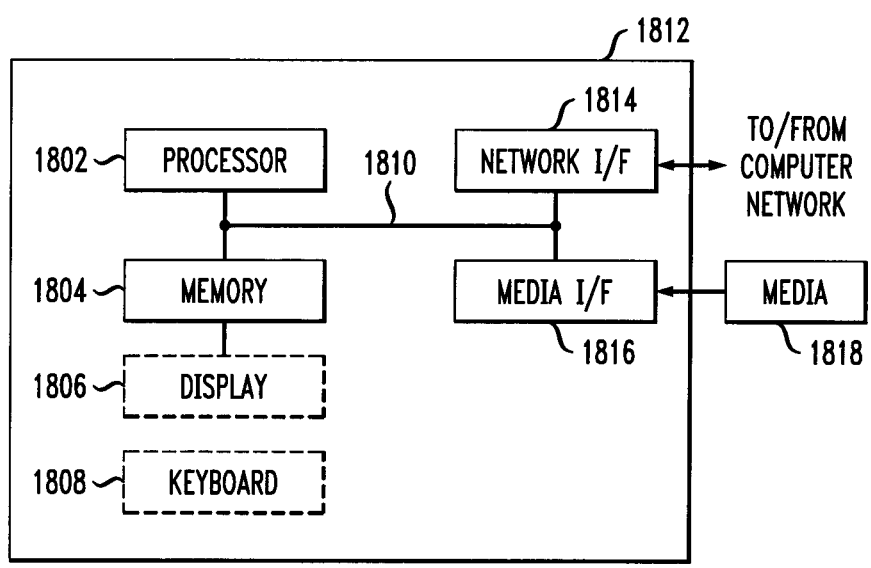
FIG. 18 depicts a computer system that may be useful in implementing one or more aspects and/or elements of the invention.

One or more embodiments can make use of software running on a general purpose computer or workstation. With reference to FIG. 18, such an implementation might employ, for example, a processor 1802, a memory 1804, and an input/output interface formed, for example, by a display 1806 and a keyboard 1808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1802, memory 1804, and input/output interface such as display 1806 and keyboard 1808 can be interconnected, for example, via bus 1810 as part of a data processing unit 1812. Suitable interconnections, for example via bus 1810, can also be provided to a network interface 1814, such as a network card, which can be provided to interface with a computer network, and to a media interface 1816, such as a diskette or CD-ROM drive, which can be provided to interface with media 1818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1818) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 1804), magnetic tape, a removable computer diskette (for example media 1818), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 1802 coupled directly or indirectly to memory elements 1804 through a system bus 1810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1808, displays 1806, pointing devices, and the like) can be coupled to the system either directly (such as via bus 1810) or through intervening I/O controllers (omitted for clarity).

Network adapters such as network interface 1814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1812 as shown in FIG. 18) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 1, such as the parameterizer 118, coarse allocator 110, utility provider 108, and/or optimizer 112. The method steps can then be carried out using the distinct software modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for allocating work requests to performing centers, said method comprising:
generating options for assigning said work requests to said performing centers, said options being based upon predetermined historical factors capturing work request characteristics and performing center characteristics, wherein said generating is carried out by a software module executing on a hardware processor;
for each of said options, scheduling said work requests to determine a corresponding duration of said work requests, wherein said scheduling is carried out by a software module executing on a hardware processor;
for each of said options, computing an overall cost, wherein said computing is carried out by a software module executing on a hardware processor, and wherein said computing comprises:
calculating, for a first group of said work requests having no dependencies, an individual estimated effort, $E_e$, via $E_e = E_b \times A_p(t, p)$, wherein:
$E_b$ is a base effort for a given type of said work requests; and
$A_p(t, p)$ is a productivity adjustment based on historical data corresponding to a given type of said work requests, t, and a given one of said performing centers, p, that a given one of said work requests is assigned to;
calculating, for a second group of said work requests having dependencies on k other ones of said work requests executing on k other performing centers, $E_e$, via $E_e = E_b \times A_{CN} \times A_p(t, p)$ wherein $A_{CN}$ is a net collaboration adjustment factor calculated as a product of individual collaboration adjustment factors for said k other ones of said work requests;
calculating, for each of said work requests, an individual cost as a product of $E_e$ and a unit cost; and
adding said individual cost of each of said work requests to determine said overall cost of said work requests; and
selecting one of said options based on said overall cost and said corresponding duration, wherein said selecting is carried out by a software module executing on a hardware processor.

2. The method of claim 1, further comprising identifying, for each of said work requests, from among said performing centers, a first short list of candidate ones of said performing centers, said identifying being carried out by matching capabilities of said performing centers against each of said work requests, said capabilities being represented as meta-data, wherein, in said step of generating said options, said options comply with said first short list.

3. The method of claim 2, further comprising reducing each first short list to a second short list, based on minimum acceptable ratings of quality and risk, each second short list comprising a reduced set of said candidate ones of said performing centers capable of performing a corresponding one of said work requests, wherein, in said step of generating said options, said options comply with said second short list.

4. The method of claim 3, wherein, in said step of identifying said first short list, said meta-data comprises at least one taxonomy defining pertinent technical and skill features of said performing centers, and relationships among said features based on specific usage scenarios.

5. The method of claim 3, further comprising the additional steps of:
obtaining, as input, a statement of work and a service level agreement; and
providing a system comprising distinct software modules embodied on a tangible computer-readable storage medium, said distinct software modules comprising a coarse allocator module and an optimizer module;
wherein:
said steps of identifying said first short list for each of said work requests, reducing each first short list to a second short list, and generating said options for assigning said work requests to said performing centers are carried out by executing said coarse allocator module on a hardware processor;

said work requests are in accordance with said statement of work;

said coarse allocator module generates said options to comply with said statement of work and said service level agreement; and said steps of scheduling said work requests and computing said overall cost are carried out by executing said optimizer module on a hardware processor.

6. The method of claim 1, wherein said scheduling said work requests to determine said corresponding duration comprises:

for each of said work requests, determining an individual duration in accordance with:

$$D_e = D_b \times A_D$$

where:
$D_e$ comprises said corresponding duration to be determined;
$D_b$ comprises a base duration for a first type of said work requests; and
$A_D$ comprises a duration adjustment based on historical data corresponding to said first type of said work requests and a given one of said performing centers that a given one of said work requests is assigned to; and
adding said individual duration of each of said work requests to determine said corresponding duration of said work requests.

7. The method of claim 6, further comprising determining a plurality of values of $A_D$ based on:

$$A_D(t,p) = \text{Average}(D_a/D_b)$$

where:
$D_a$ comprises an actual duration of a given historical work request of type t assigned to a given one of said performing centers p; and
$D_b$ comprises a base duration of said given historical work request of type t.

8. The method of claim 1, further comprising determining a plurality of values of $A_p$ (t, p) based on:

$$A_p(t,p) = \text{Average}(E_a/E_b)$$

where:
$E_a$ comprises actual effort for a given historical work request of type t assigned to a given one of said performing centers p.

9. The method of claim 1, further comprising:
determining said individual collaboration adjustment factors in accordance with:

$$A_C(p_i, p_j) = \text{Average}(E_a(x)/E_e(x))$$

where:
$A_C(p_i, p_j)$ comprises a given one of said individual collaboration adjustment factors for a given pair of said performing centers $p_i$ and $p_j$ for a given instance of one of said work requests x for which x was in $p_i$ and a dependent one of said work requests y was in $p_j$;
$E_a(x)$ is actual effort expended on x;
$E_e(x)$ is estimated effort if y was also in $p_i$; and
said Average$(E_a(x)/E_e(x))$ is over all such work request instances x and y.

10. The method of claim 1, wherein:
said scheduling said work requests to determine said corresponding duration comprises:

for each of said work requests, determining an individual duration in accordance with:

$$D_e = D_b \times A_D$$

where:
$D_e$ comprises said corresponding duration to be determined;
$D_b$ comprises a base duration for a given type of said work requests; and
$A_D$ comprises a duration adjustment based on historical data corresponding to said given type of said work requests and a given one of said performing centers that a given one of said work requests is assigned to;
adding said individual duration of each of said work requests to determine said corresponding duration of said work requests;
determining a plurality of values of $A_D$ based on:

$$A_D(t,p) = \text{Average}(D_a/D_b)$$

where:
$D_a$ comprises an actual duration of a given historical work request of type t assigned to a given one of said performing centers p; and
$D_b$ comprises a base duration of said given historical work request of type t; and
determining a plurality of values of $A_p$ (t, p) based on:

$$A_p(t,p) = \text{Average}(E_a/E_b)$$

where:
$E_a$ comprises actual effort for a given historical work request of type t assigned to a given one of said performing centers p.

11. The method of claim 1, further comprising configuring a performing center in accordance with said selecting step.

12. A computer program product comprising a tangible computer readable storage medium including computer usable program code for allocating work requests to performing centers, said computer program product including:

computer usable program code for generating options for assigning said work requests to said performing centers, said options being based upon predetermined historical factors capturing work request characteristics and performing center characteristics;

computer usable program code for, for each of said options, scheduling said work requests to determine a corresponding duration of said work requests;

computer usable program code for, for each of said options, computing an overall cost, wherein said computing comprises:

calculating, for a first group of said work requests having no dependencies, an individual estimated effort, $E_e$, via $E_e = E_b \times A_p(t, p)$, wherein:
$E_b$ is a base effort for a given type of said work requests; and
$A_p$ (t, p) is a productivity adjustment based on historical data corresponding to a given type of said work requests, t, and a given one of said performing centers, p, that a given one of said work requests is assigned to;

calculating, for a second group of said work requests having dependencies on k other ones of said work requests executing on k other performing centers, $E_e$, via $E_e = E_b \times A_{CN} \times A_p$ (t, p) wherein $A_{CN}$ is a net collaboration adjustment factor calculated as a product of individual collaboration adjustment factors for said k other ones of said work requests;

calculating, for each of said work requests, an individual cost as a product of $E_e$ and a unit cost; and adding said individual cost of each of said work requests to determine said overall cost of said work requests; and computer usable program code for facilitating selecting one of said options based on said overall cost and said corresponding duration.

13. The computer program product of claim 12, wherein said computer usable program code for scheduling said work requests to determine said corresponding duration comprises:

computer usable program code for, for each of said work requests, determining an individual duration in accordance with:

$$D_e = D_b \times A_D$$

where:

$D_e$ comprises said corresponding duration to be determined;

$D_b$ comprises a base duration for a first type of said work requests; and $A_D$ comprises a duration adjustment based on historical data corresponding to said first type of said work requests and a given one of said performing centers that a given one of said work requests is assigned to; and computer usable program code for adding said individual duration of each of said work requests to determine said corresponding duration of said work requests.

14. The computer program product of claim 13, further comprising computer usable program code for determining a plurality of values of $A_D$ based on:

$$A_D(t,p) = \text{Average}(D_a/D_b)$$

where:

$D_a$ comprises an actual duration of a given historical work request of type t assigned to a given one of said performing centers p; and $D_b$ comprises a base duration of said given historical work request of type t.

15. An apparatus for allocating work requests to performing centers, said apparatus comprising:

a memory; and at least one processor, coupled to said memory, and operative to:

generate options for assigning said work requests to said performing centers, said options being based upon predetermined historical factors capturing work request characteristics and performing center characteristics;

for each of said options, schedule said work requests to determine a corresponding duration of said work requests;

for each of said options, compute an overall cost, wherein said computing comprises:

calculating, for a first group of said work requests having no dependencies, an individual estimated effort, $E_e$, via $E_e = E_b \times A_p(t, p)$, wherein:

$E_b$ is a base effort for a given type of said work requests; and $A_p(t, p)$ is a productivity adjustment based on historical data corresponding to a given type of said work requests, t, and a given one of said performing centers, p, that a given one of said work requests is assigned to;

calculating, for a second group of said work requests having dependencies on k other ones of said work requests executing on k other performing centers, $E'_e$, via $E_e = E_b \times A_{CN} \times A_p(t, p)$ wherein $A_{CN}$ is a net collaboration adjustment factor calculated as a product of individual collaboration adjustment factors for said k other ones of said work requests;

calculating, for each of said work requests, an individual cost as a product of $E_e$ and a unit cost; and adding said individual cost of each of said work requests to determine said overall cost of said work requests; and facilitate selection of one of said options based on said overall cost and said corresponding duration.

16. The apparatus of claim 15, wherein said processor is operative to schedule said work requests to determine said corresponding duration by being operative to:

for each of said work requests, determine an individual duration in accordance with:

$$D_e = D_b \times A_D$$

where:

$D_e$ comprises said corresponding duration to be determined;

$D_b$ comprises a base duration for a first type of said work requests; and $A_D$ comprises a duration adjustment based on historical data corresponding to said first type of said work requests and a given one of said performing centers that a given one of said work requests is assigned to; and add said individual duration of each of said work requests to determine said corresponding duration of said work requests.

17. The apparatus of claim 16, wherein said processor is further operative to determine a plurality of values of $A_D$ based on:

$$A_D(t,p) = \text{Average}(D_a/D_b)$$

where:

$D_a$ comprises an actual duration of a given historical work request of type t assigned to a given one of said performing centers p; and $D_b$ comprises a base duration of said given historical work request of type t.

* * * * *